US012562329B2

(12) United States Patent
Malich et al.

(10) Patent No.: US 12,562,329 B2
(45) Date of Patent: Feb. 24, 2026

(54) EXHAUST GAS MODULE FOR AN ELECTRICAL SWITCH, DEVICE FORMED BY TWO EXHAUST GAS MODULES OF THIS TYPE AND SWITCH CABINET COMPRISING A DEVICE OF THIS TYPE

(71) Applicant: Siemens Aktiengesellschaft, Munich (DE)

(72) Inventors: Timo Malich, Kümmersbruck (DE); Ekkehard Plechinger, Röckersbühl (DE); Christoph Weber, Ergoldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 507 days.

(21) Appl. No.: 18/012,688

(22) PCT Filed: May 27, 2021

(86) PCT No.: PCT/EP2021/064139
§ 371 (c)(1),
(2) Date: Dec. 23, 2022

(87) PCT Pub. No.: WO2021/259585
PCT Pub. Date: Dec. 30, 2021

(65) Prior Publication Data
US 2023/0187155 A1 Jun. 15, 2023

(30) Foreign Application Priority Data
Jun. 23, 2020 (DE) ..................... 10 2020 207 775.4

(51) Int. Cl.
*H01H 71/02* (2006.01)
*H01H 9/34* (2006.01)
(Continued)

(52) U.S. Cl.
CPC .......... *H01H 71/025* (2013.01); *H01H 9/342* (2013.01); *H01H 71/1045* (2013.01); *H02B 13/025* (2013.01)

(58) Field of Classification Search
CPC .. H01H 9/342; H01H 33/91; H01H 2033/888; H01H 73/18; H01H 2009/343;
(Continued)

(56) References Cited

U.S. PATENT DOCUMENTS 8,063,334 B2 11/2011 Dahl
2012/0120558 A1* 5/2012 Raabe ................. H01H 71/025
361/619

FOREIGN PATENT DOCUMENTS

EP 2081202 A2 7/2009
EP 2645487 A1 10/2013
(Continued)

*Primary Examiner* — Ahmed M Saeed
(74) *Attorney, Agent, or Firm* — Laurence A. Greenberg; Werner H. Stemer; Ralph E. Locher

(57) ABSTRACT
An exhaust gas module for an electrical switch, which has outlets for switching gases on its output side and/or its input side. The exhaust gas module can be mounted on the electrical switch, such that the switching gases are directed into an exhaust gas channel of the exhaust gas module. The exhaust gas channel deflects the switching gases substantially at a right angle and the exhaust gas channel can cooperate in a modular manner with a neighboring exhaust gas channel of a neighboring exhaust gas module in order to bring together the deflected exhaust gases.

8 Claims, 8 Drawing Sheets

(51) Int. Cl.
    *H01H 71/10*          (2006.01)
    *H02B 13/025*        (2006.01)
(58) Field of Classification Search
    CPC ........ H01H 9/46; H01H 33/74; H01H 71/025;
                H01H 71/1045; H01H 71/0264; H02B
            1/56; H02B 13/055; H02B 13/065; H02B
                                    5/06; H02B 13/025
    See application file for complete search history.

(56)                References Cited

FOREIGN PATENT DOCUMENTS

EP          2641255  B1    1/2018
ES          2525035  T3    12/2014

* cited by examiner

EXHAUST GAS MODULE FOR AN ELECTRICAL SWITCH, DEVICE FORMED BY TWO EXHAUST GAS MODULES OF THIS TYPE AND SWITCH CABINET COMPRISING A DEVICE OF THIS TYPE

FIELD AND BACKGROUND OF THE INVENTION

The invention relates to an exhaust gas module for an electrical switch, to a device formed by two exhaust gas modules of this type, and to a switch cabinet comprising a device of this type.

The short-circuit turning-off of circuit breakers gives rise to switching gases which carry impurities with them. For example, these impurities can be metal beads or soot particles. In the event of a short-circuit, these impurities are distributed throughout the installation. Affected switch cabinets and distributors have to be cleaned frequently in a complicated way, which may lead to installation downtimes. Similarly, electrical devices or lines in said distributors may be adversely affected by metal beads carried along by the switching gases, for example may result in short-circuits. Overall, these impurities may lead to installation downtimes, either because of necessary cleaning steps or because of maintenance work to remove short circuits.

SUMMARY OF THE INVENTION

It is the object of the present invention to provide an exhaust gas module for mounting on an electrical switch, which exhaust gas module can be mounted in a simple manner in a switch panel having various electrical switches and provides a modular exhaust gas system in a simple manner.

The object according to the invention is achieve by the exhaust gas module as claimed. Advantageous refinements of the exhaust gas module according to the invention are specified in dependent claims. The object according to the invention is likewise achieved by the device as claimed. Advantageous refinements of the device according to the invention are specified in dependent claims. The object according to the invention is also achieved by the switch cabinet as claimed. An advantageous refinement of the switch cabinet according to the invention is specified in a dependent patent claim.

The exhaust gas module for an electrical switch as claimed is configured in such a manner that the electrical switch has outlets for switching gases on its output side and/or on its input side, wherein the exhaust gas module can be mounted on the electrical switch such that the switching gases are directed into an exhaust gas channel of the exhaust gas module, wherein the exhaust gas channel deflects the switching gases substantially at a right angle, and the exhaust gas channel can interact in a modular manner with a neighboring exhaust gas channel of a neighboring exhaust gas module in order to bring together the deflected switching gases.

An advantage in this connection is that, after a short-circuit, the soot and contact combustion particles are guided out of the switch in a defined way and, as a result, for example, a switch cabinet or a distributor is not soiled and therefore cleaning is also avoided.

In one refinement of the exhaust gas module according to the invention, an exhaust gas channel is arranged on the output side and/or on the input side of the electrical switch.

In a further refinement of the exhaust gas module according to the invention, the exhaust gas channel comprises ribs which isolate the switching gases from one another pole by pole.

In one refinement of the exhaust gas module according to the invention, barriers are arranged at the exhaust gas channel, said barriers isolating electrical lines from one another in the event of the exhaust gas module being mounted on the electrical switch.

The device as claimed comprises a first exhaust gas module according to the invention and a second exhaust gas module according to the invention, wherein the first exhaust gas module is mounted adjacent to the second exhaust gas module such that the respective exhaust gas channels grip one inside the other in modular fashion and the deflected switching gases are thereby brought together.

In one refinement of the device according to the invention, a first electrical switch is mounted on the first exhaust gas module and a second electrical switch is mounted on the second exhaust gas module.

In a further refinement of the device according to the invention, the first electrical switch and/or the second electrical switch is a circuit breaker.

The switch cabinet as claimed has a device according to the invention, the device is fastened to a wall of the switch cabinet, and switching gases which have been brought together are guided out of the switch cabinet.

In one refinement of the switch cabinet according to the invention, the switching gases which have been brought together are guided out of the switch cabinet via a flexible channel.

The above-described properties, features and advantages of this invention and the manner in which they are achieved will become clearer and more clearly comprehensible in conjunction with the description below of the exemplary embodiments which will be explained in more detail in conjunction with the figures.

DETAILED DESCRIPTION OF THE INVENTION

Figure 1:
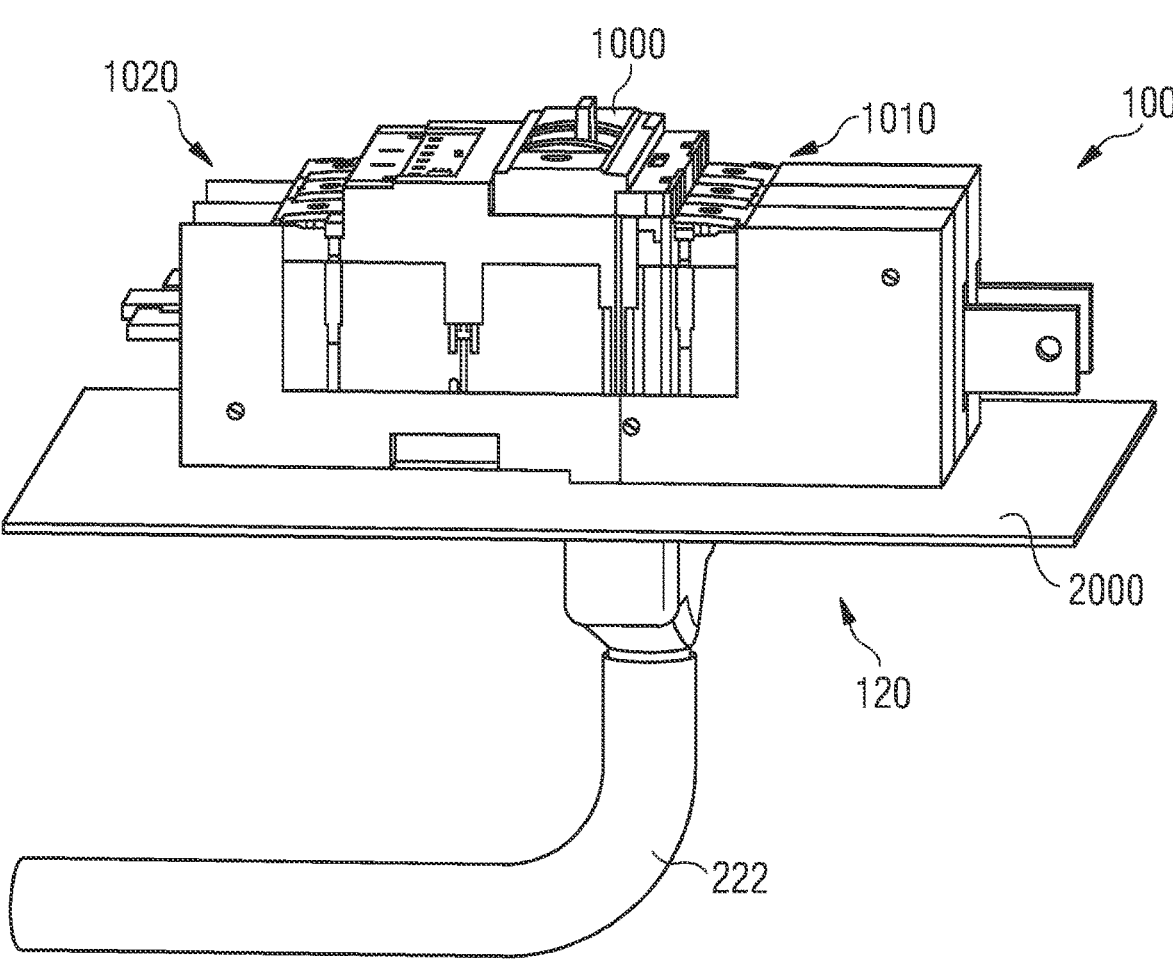
FIG. 1: shows an exhaust gas module according to the invention mounted on an electrical switch.

FIG. 1 illustrates an exhaust gas module 100 according to the invention for an electrical switch 1000. The electrical switch 1000 has outlets for switching gases on its output side 1010 and/or on its input side 1020. In the illustration of FIG. 1, the exhaust gas module 100 is mounted on an electrical switch 1000 such that the switching gases are directed into an exhaust gas channel 150 of the exhaust gas module 100.

The exhaust gas channel 150 deflects the switching gases substantially at a right angle and can interact in modular fashion with a neighboring exhaust gas channel 150 of a neighboring exhaust gas module 101 in order to bring together the deflected switching gases. This will be explained in more detail with reference to FIGS. 4A and 4B, 5, 6A and 6B, 7 and 8.

The exhaust gas module 100 according to the invention is fastened to a wall 2000 of a switch cabinet. The switching gases which have been brought together can be led out of the switch cabinet via a flexible channel 222.

Figure 2:
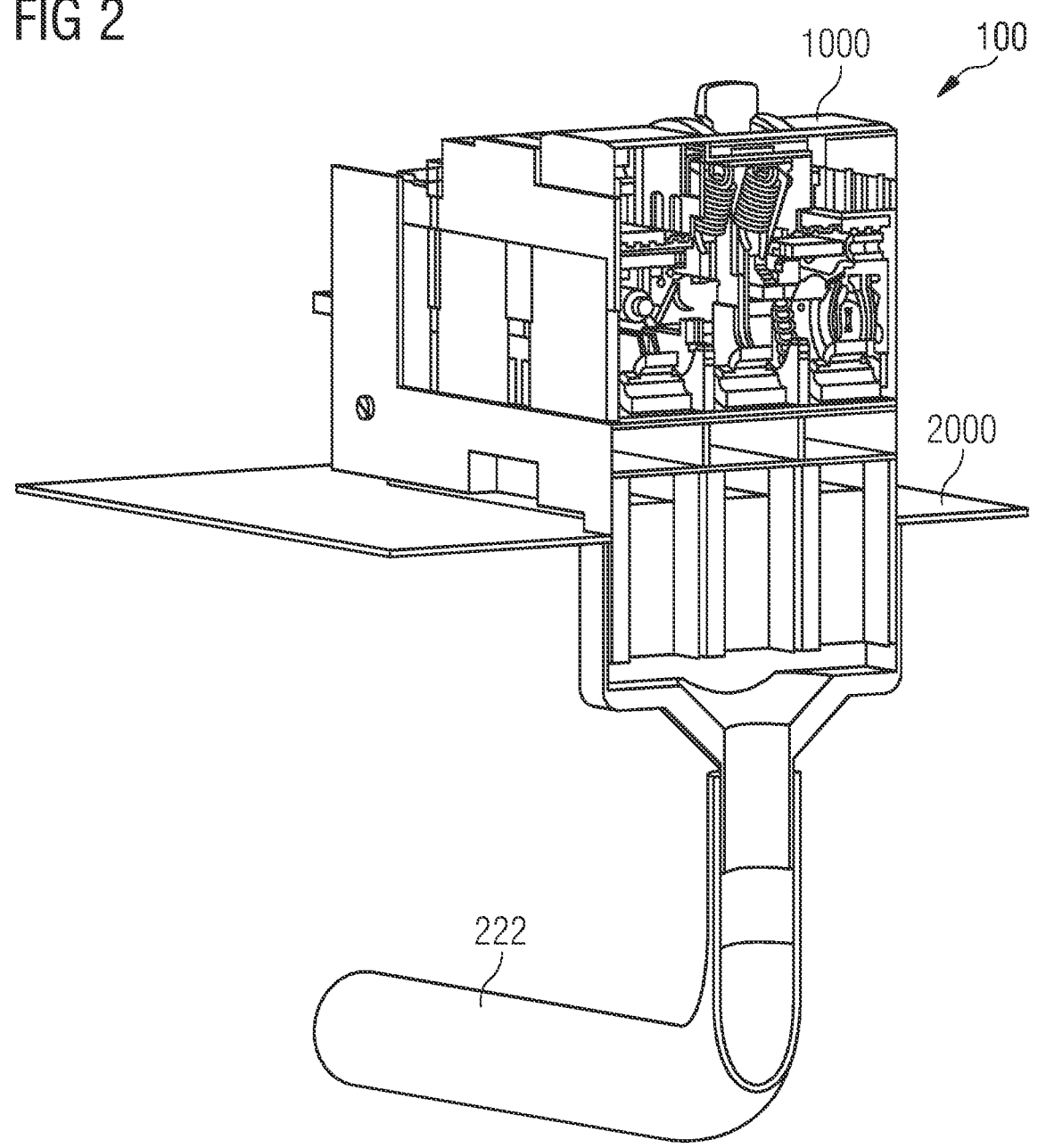
FIG. 2: shows a cross section through the exhaust gas module according to the invention.

FIG. 2 shows, in a sectional illustration, the exhaust gas module 100 according to the invention mounted on the electrical switch 1000. The wall 2000 of the switch cabinet and the flexible channel 222 which leads the switching gases which have been brought together out of the switch cabinet are also illustrated.

Figure 3B:
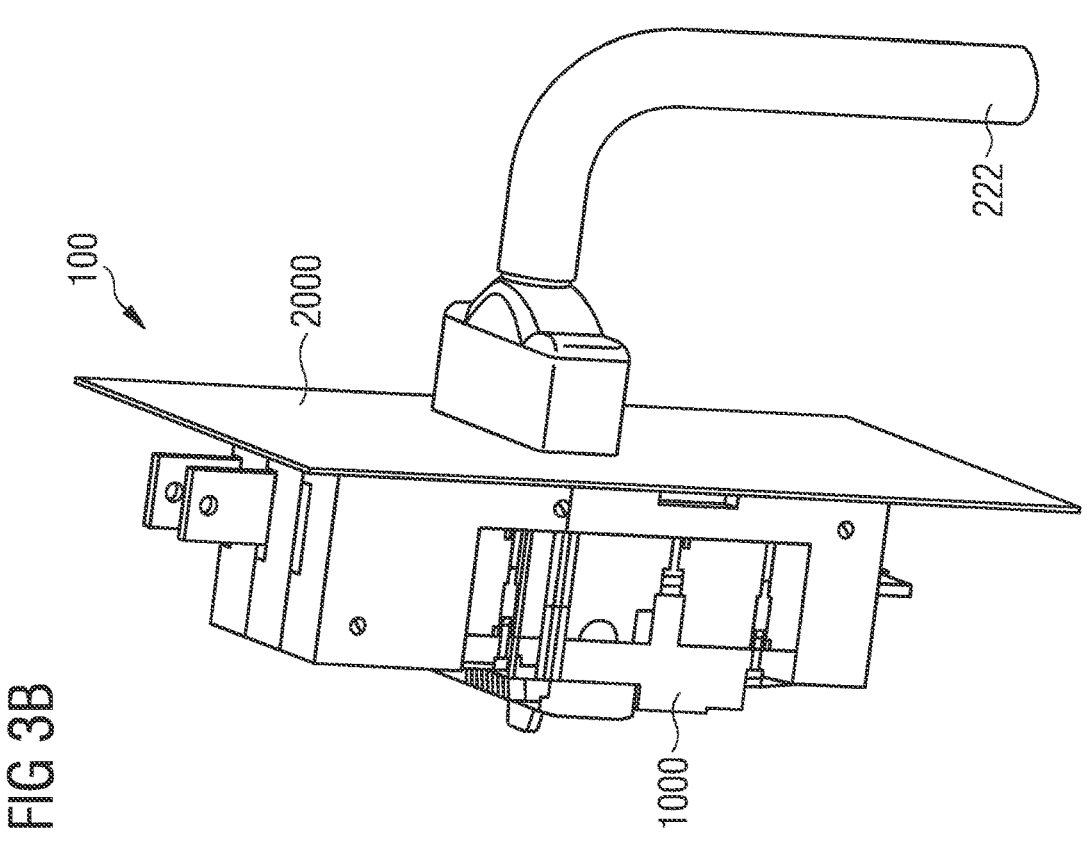
FIGS. 3A and 3B: show an exhaust gas module according to the invention with an electrical switch mounted on a wall of a switch cabinet.
Figure 3A:
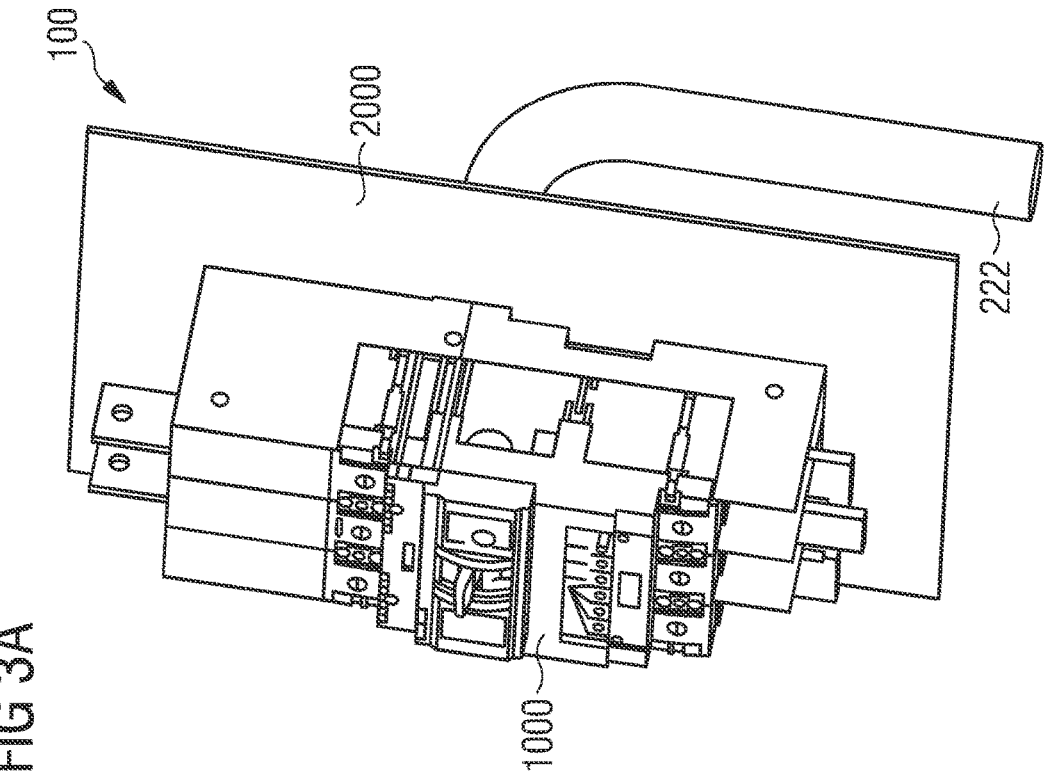

FIGS. 3A and 3B show the exhaust gas module 100 according to the invention mounted on the wall 2000 of the switch cabinet and with a flexible channel 222 from different sides.

In the case of the exhaust gas module 100 according to the invention, an exhaust gas channel 150 is arranged on the output side 1010 or on the input side 1020 of the electrical switch 1000; it is also possible for the exhaust gas module to comprise an exhaust gas channel 150 on the output side 1010 and on the input side 1020 of the electrical switch.

Figure 4B:
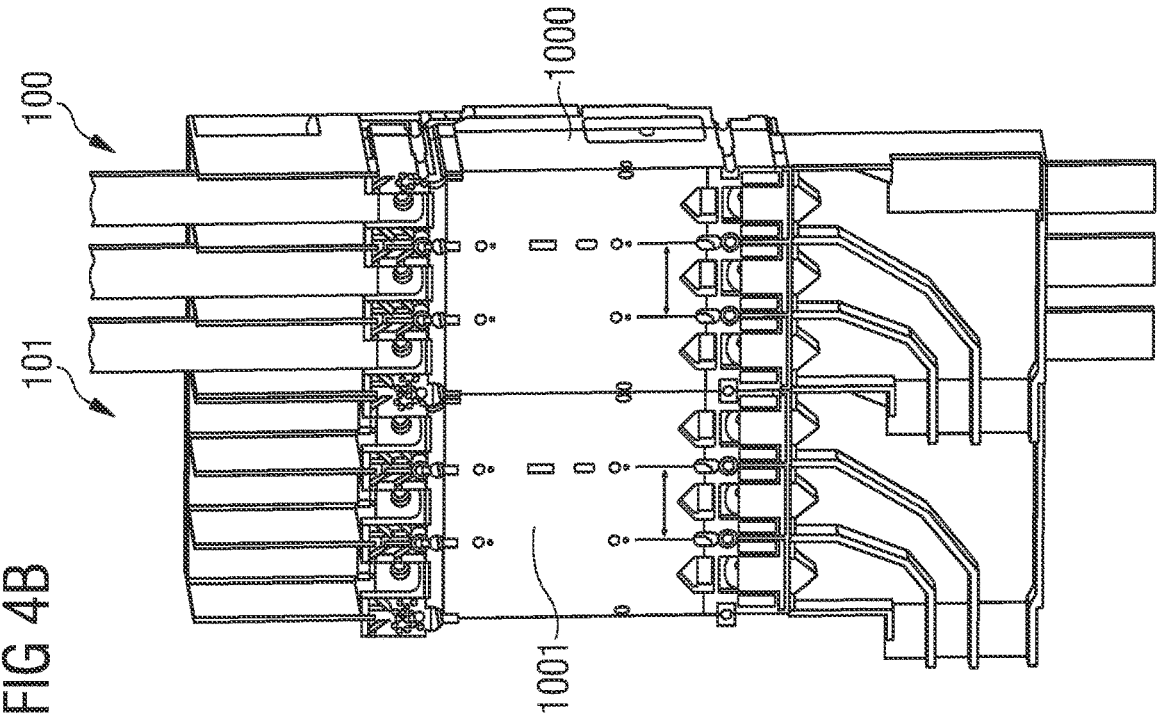
FIGS. 4A and 4B: show an exhaust gas module according to the invention with an exhaust gas duct and ribs and also barriers.
Figure 4A:
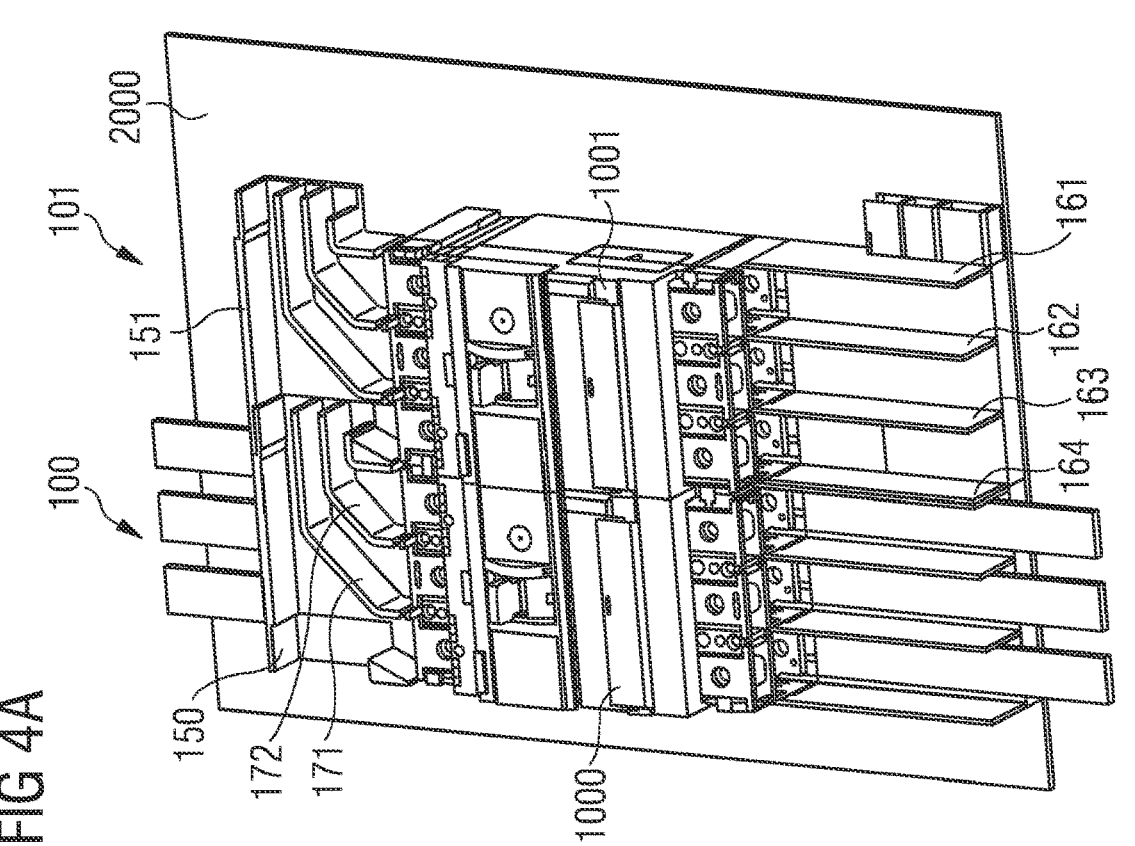

FIGS. 4A and 4B illustrate a device formed by two exhaust gas modules 100, 101 according to the invention. The exhaust gas channel 150 deflects the switching gases substantially at a right angle and the exhaust gas channel 150 interacts in modular fashion with a neighboring exhaust gas channel 151 of a neighboring exhaust gas module 101 in order to bring together the deflected switching gases.

The exhaust gas channel 150 comprises ribs 171, 172 which isolate the switching gases from one another pole by pole. Similarly, barriers 161, 162, 163, 164 can be arranged at the exhaust gas channel 150, said barriers being able to isolate electrical lines 191, 192, 193 from one another in the event of the exhaust gas module 100 being mounted on the electrical switch 1000.

According to the illustration of FIGS. 4A and 4B, the barriers 161, 162, 163, 164 can be arranged in a plane directly above or below the exhaust gas channel 150.

The device according to the invention therefore comprises a first exhaust gas module 100 and a second exhaust gas module 101, wherein the first exhaust gas module 100 is mounted adjacent to the second exhaust gas module 101 such that the respective exhaust gas channels 150, 151 grip one inside the other in modular fashion and the deflected switching gases are thereby brought together. According to the illustration of FIGS. 4A and 4B, an electrical switch 1000 is mounted on the first exhaust gas module 100 and a second electrical switch 1001 is mounted on the second exhaust gas module 101.

The first electrical switch 1000 can be a circuit breaker; similarly, the second electrical switch 1001 can likewise be a circuit breaker.

Figure 5:
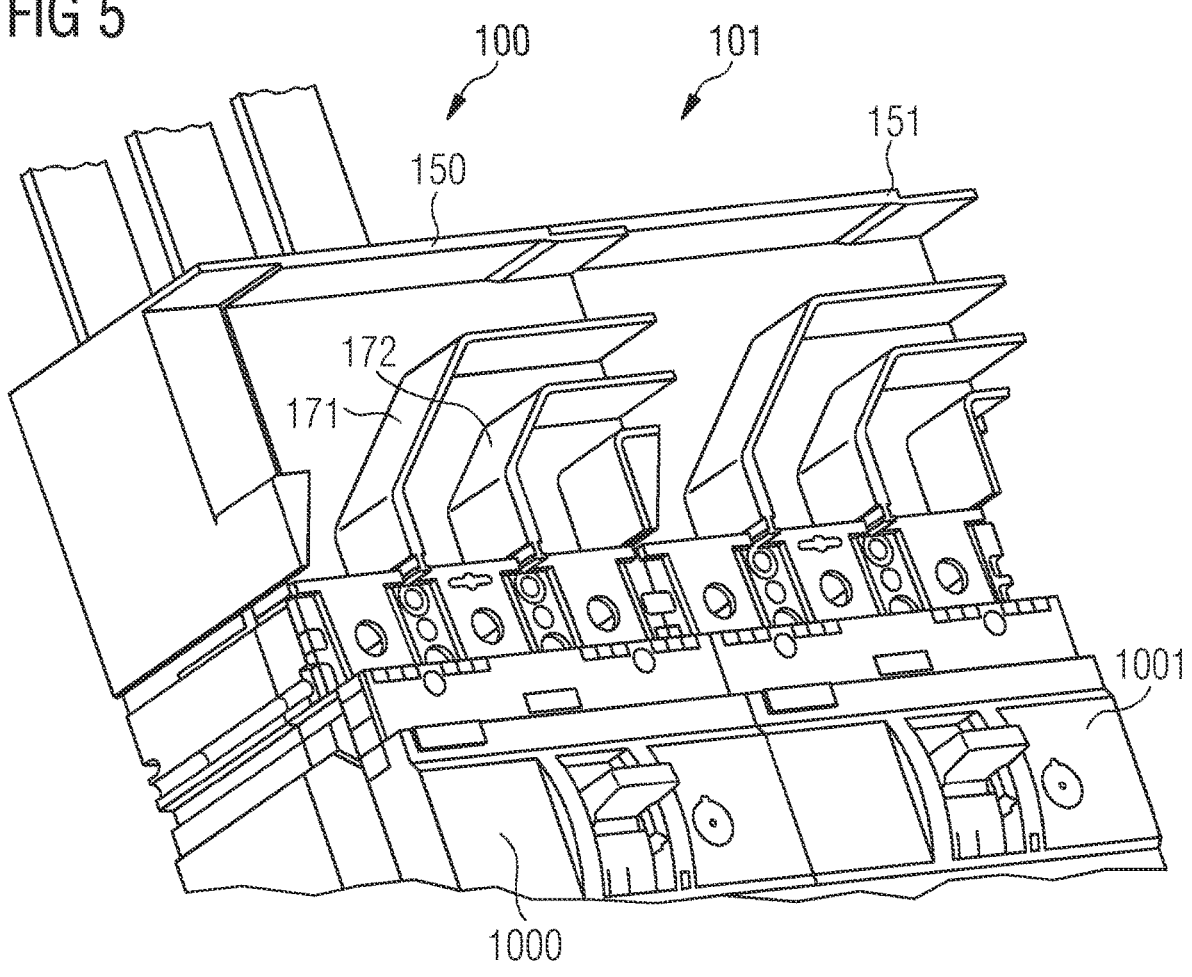
FIG. 5: shows a device formed by a first exhaust gas module and second exhaust gas module.

FIG. 5 shows in more detail the device according to the invention formed by a first exhaust gas module 100 and second exhaust gas module 101. The respective exhaust gas channels 150, 151 grip one inside the other in modular fashion, as a result of which the deflected switching gases are brought together.

Figure 6A:
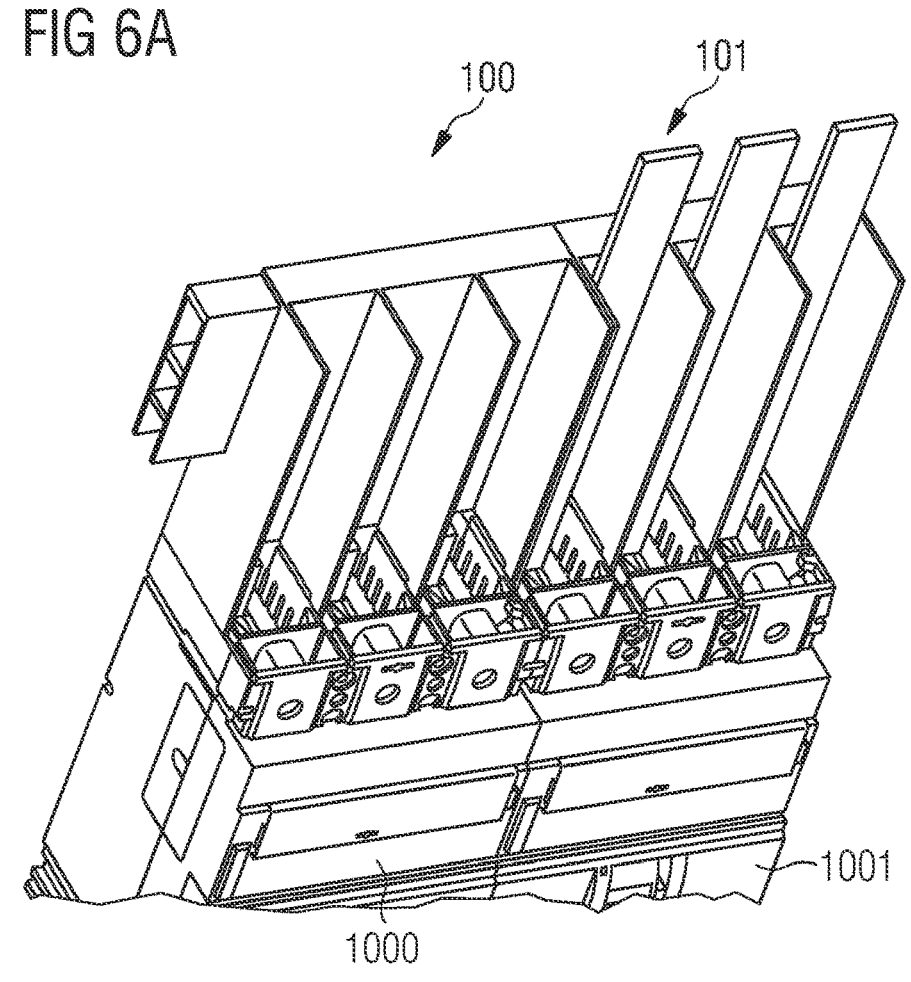
FIGS. 6A and 6B: show a device formed by a first exhaust gas module and second exhaust gas module, and also a channel covering on the exhaust gas module.
Figure 6B:
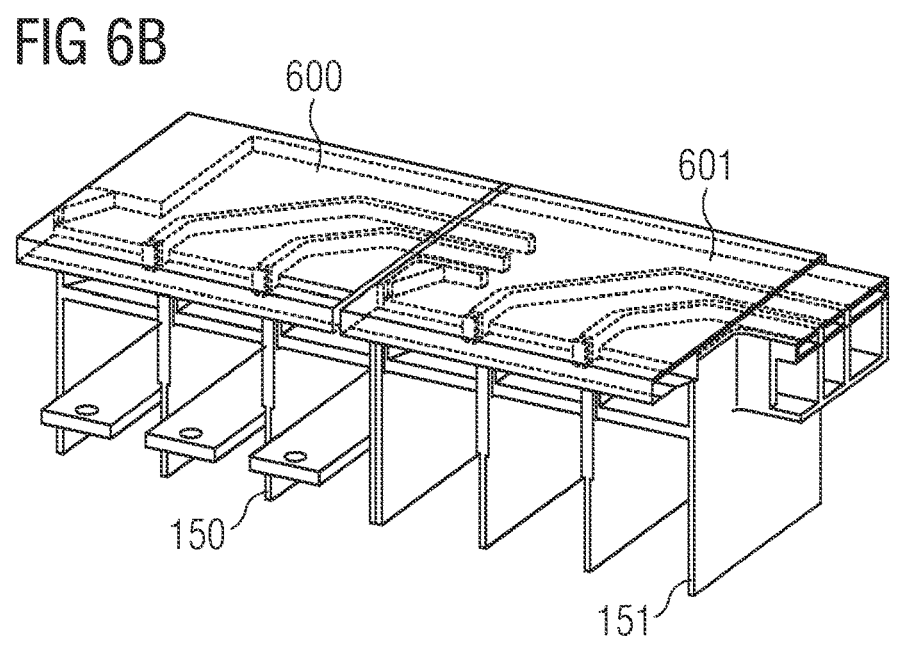

FIG. 6A likewise illustrates the device according to the invention formed by a first exhaust gas module 100 and second exhaust gas module 101 and, mounted on said exhaust gas modules, the first electrical switch 1000 and the second electrical switch 1001. FIG. 6B illustrates the first exhaust gas module 100 with a first exhaust gas channel 150 and the second exhaust gas module 101 with a second exhaust gas channel 151. Furthermore, coverings 600, 601 are shown which close the respective exhaust gas channels 150, 151 and therefore ensure that the exhaust gas modules 100, 101 withstand the turning-off pressure of the electrical switches 1000, 1001 and that as little gas as possible passes to the outside or to the neighboring pole due to leakages of the exhaust gas channels 150, 151.

Figure 7:
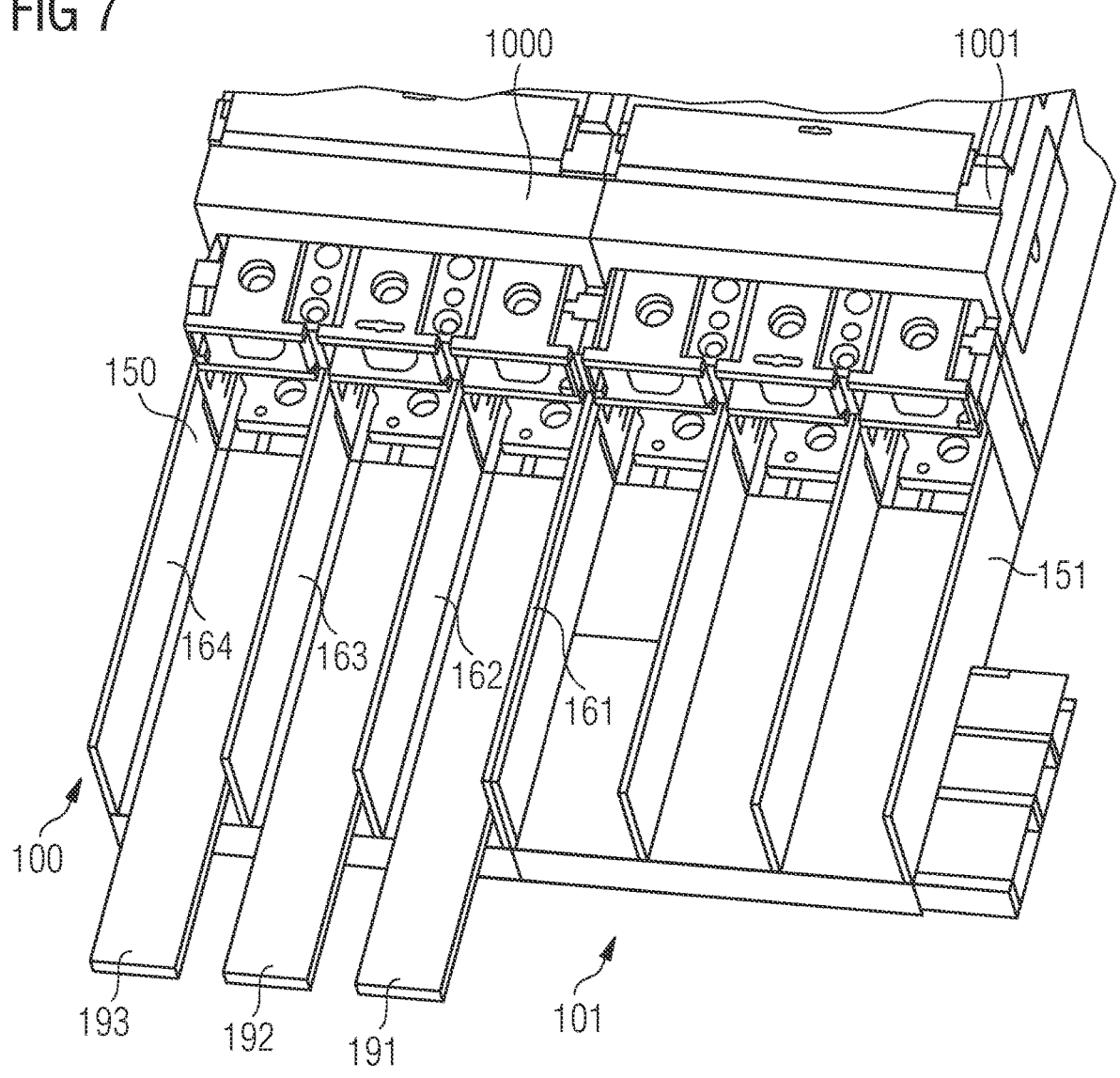
FIG. 7: shows a device according to the invention comprising a first exhaust gas module and a second exhaust gas module and also a first electrical switch and second electrical switch.

FIG. 7 shows the device according to the invention formed by a first exhaust gas module 100 and second exhaust gas module 101. Barriers 161, 162, 163, 164 are arranged here at the exhaust gas channel 150, said barriers isolating electrical lines 191, 192, 193, such as busbars, from one another when the electrical switch 1000 is mounted.

Figure 8:
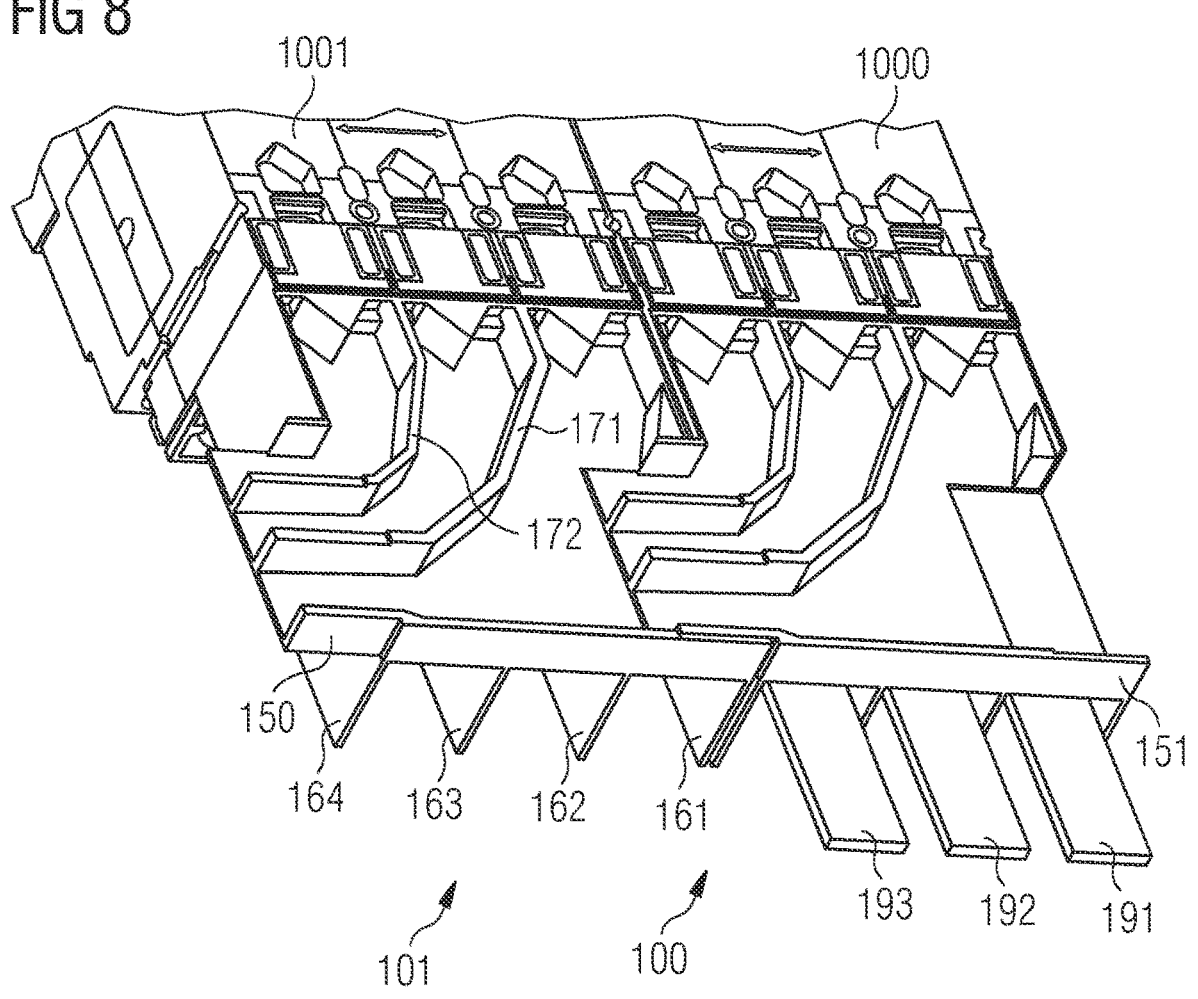
FIG. 8: shows a device according to the invention comprising a first exhaust gas module and second exhaust gas module and also a first electrical switch and second electrical switch.

FIG. 8 shows the underside of the illustration of the device according to the invention from FIG. 7. The respective exhaust gas channels 150, 151 of the first exhaust gas module 100 and of the second exhaust gas module 101 grip one inside the other in modular fashion, as a result of which the deflected switching gases are brought together.

The modular exhaust gas modules 100, 101 with exhaust gas channels 150, 151 are shaped in such a manner that the exhaust gases or switching gases thereof can flow into the neighboring channel and are therefore conducted from one exhaust gas module into the next exhaust gas module until they are conducted out of a switch cabinet at any location at the end. This ensures that, after a short-circuit of the electrical switch, the resulting soot and contact combustion particles are guided in a defined manner out of a switch cabinet and, as a result, the switch cabinet is not soiled and therefore also does not have to be cleaned.

The invention claimed is:

1. An exhaust gas module for an electrical switch, wherein the electrical switch is formed with outlets for switching gases on at least one of an output side thereof or on an input side thereof, and wherein:
  the exhaust gas module is configured for mounting on the electrical switch and the exhaust gas module is formed with an exhaust gas channel disposed for the switching gases to be directed into said exhaust gas channel;
  said exhaust gas channel being formed to deflect the switching gases substantially at a right angle, and said exhaust gas channel being configured to interact in a modular manner with a neighboring exhaust gas channel of a neighboring exhaust gas module in order to bring together the switching gases thus deflected; and
  said exhaust gas channel comprises ribs disposed to isolate the switching gases from one another pole by pole.

2. The exhaust gas module according to claim 1, wherein said exhaust gas channel is arranged on at least one of the output side or the input side of the electrical switch.

3. An exhaust gas module for an electrical switch, wherein the electrical switch is formed with outlets for switching gases on at least one of an output side thereof or on an input side thereof, and wherein:
  the exhaust gas module is configured for mounting on the electrical switch and the exhaust gas module is formed with an exhaust gas channel disposed for the switching gases to be directed into said exhaust gas channel;

said exhaust gas channel being formed to deflect the switching gases substantially at a right angle, and said exhaust gas channel being configured to interact in a modular manner with a neighboring exhaust gas channel of a neighboring exhaust gas module in order to bring together the switching gases thus deflected; and barriers disposed at said exhaust gas channel, said barriers isolating electrical lines from one another when said exhaust gas module is mounted on the electrical switch.

4. An exhaust gas assembly, comprising:

a first exhaust gas module for an electrical switch formed with outlets for switching gases on at least one of an output side or an input side thereof, wherein said first exhaust gas module is configured for mounting on the electrical switch and said first exhaust gas module is formed with a first exhaust gas channel disposed for receiving the switching gases from the electrical switch;

a second exhaust gas module for an electrical switch formed with outlets for switching gases on at least one of an output side or an input side thereof, wherein said second exhaust gas module is configured for mounting on the electrical switch and said second exhaust gas module is formed with a second exhaust gas channel disposed for receiving the switching gases from the electrical switch;

each of said first and second exhaust gas channels being formed to deflect the switching gases substantially at a right angle; and said first exhaust gas module being mounted adjacent said second exhaust gas module with said first and second exhaust gas channels gripping one inside the other in modular fashion to thereby merge the deflected switching gases into one another.

5. The assembly according to claim 4, wherein a first electrical switch is mounted on said first exhaust gas module and a second electrical switch is mounted on said second exhaust gas module.

6. The assembly according to claim 5, wherein at least one of said first electrical switch or said second electrical switch is a circuit breaker.

7. A switch cabinet, comprising:

a switch cabinet wall;

an assembly according to claim 4 fastened to said wall of the switch cabinet; and wherein switching gases which have been brought together by way of said first and second exhaust gas modules are guided out of the switch cabinet.

8. The switch cabinet according to claim 7, which comprises a flexible channel configured to conduct the switching gases which have been brought together out of the switch cabinet.

\* \* \* \* \*